April 8, 1924.
C. O. PAUL
HOSE REEL
Filed Dec. 27, 1922
1,489,398
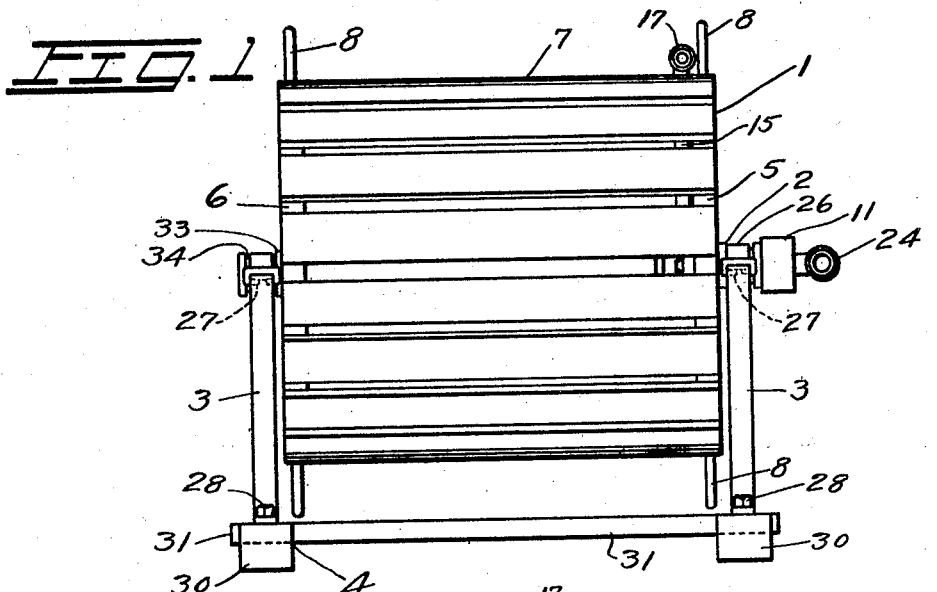
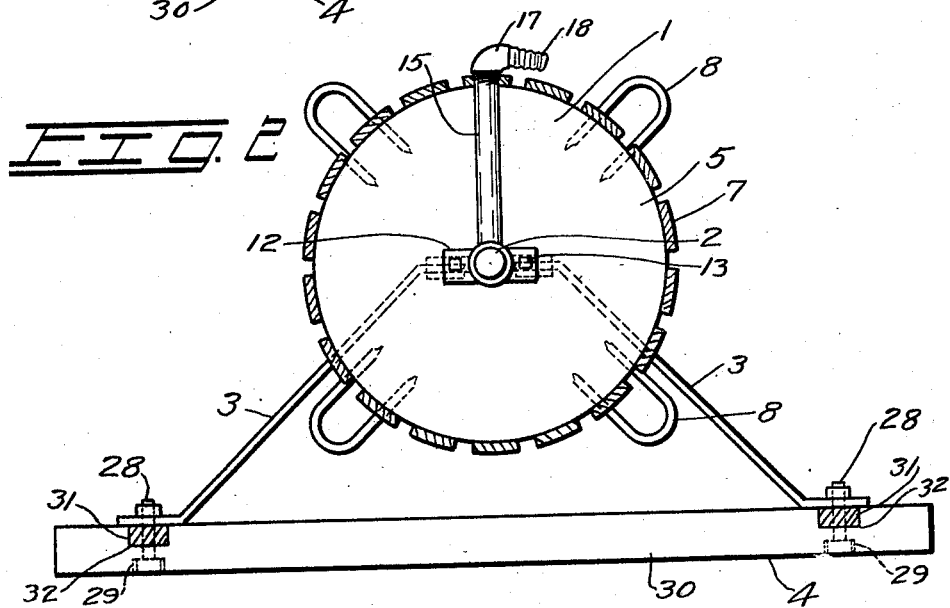
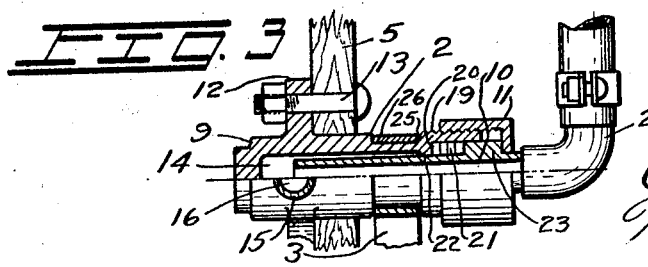
INVENTOR
Charles O. Paul
Harry Bowen
ATTORNEY Patented Apr. 8, 1924.

1,489,398

UNITED STATES PATENT OFFICE.

CHARLES O. PAUL, OF SEATTLE, WASHINGTON.

HOSE REEL.

Application filed December 27, 1922. Serial No. 609,192.

*To all whom it may concern:*

Be it known that I, CHARLES O. PAUL, a citizen of the United States, residing at Seattle, county of King, and State of Washington, have invented a new and useful Hose Reel; and I do hereby declare that the following is a full, clear, and exact specification, such as will enable others skilled in the art to which it appertains to make and use the same.

The invention is a hose reel with a connection through one of its hubs by which the inner end of a hose on the reel may be connected to a tap.

The object of the invention is to provide an attachment for a hose reel by which water may be run through the hose on the reel.

Another object of the invention is to provide a hose reel with an attachment that will make it possible to use a small portion of the hose without taking the entire length off of the reel.

And a further object of the invention is to provide a hub for a hose reel through which water may pass while the reel is turning and which may be connected on the outside to a water tap and on the inside to the inner end of the hose on the reel.

With these ends in view the invention embodies a hose reel with one of its hubs constructed in the form of a sleeve with an inner sleeve held in it with an adjusting nut and said sleeves having packing rings between them. The outer end of the inner sleeve being so constructed that a hose may be placed over it or connected to it and the inner end of the outer sleeve having flanges on it by which it may be bolted to the end of the reel and a pipe connection in it which extends through the surface of the reel so that the inner end of the hose may be attached to it.

Other features and advantages of the invention will appear from the following description taken in connection with the drawings, wherein:—

Figure 1 is an end elevation.

Figure 2 is a cross section.

Figure 3 is a detail view of the hub with the upper half broken away on the center line.

In the drawings I have shown my reel as it would be constructed wherein numeral 1 indicates the reel, numeral 2 the special hub, numeral 3 the base and numeral 4 the supporting brackets.

The reel 1 is constructed of two wood discs 5 and 6 which are held together by cross members 7 and in the discs or ends are guards 8 which are in the form of large staples, that prevent the hose from sliding off of the end of the reel.

In the center of the disc 5 which forms the right hand end of the reel in the design shown is the special hub 2 that is constructed of a sleeve 9 as shown in Figure 3, an inner sleeve 10 and a packing nut 11. The sleeve 9 is constructed as shown with flanges 12 projecting outward from two sides by which it is held to the disc 5 by the bolts 13. In the inside of the sleeve is an opening 14 into which a pipe 15 that is screwed into an opening 16 in the side of the sleeve extends so that a liquid in the sleeve may pass into the pipe. On the outer end of the pipe is an elbow 17 which has a corrugated end 18 to which the end of a hose may readily be attached as the hose is placed on the reel. It will be seen that this fitting is constructed with a curvature to correspond with that of the circumference of the reel so that the hose will lay on the surface of the reel smoothly.

At the inner end of the sleeve 9 is a threaded portion 19 upon which the nut 11 is screwed and on the inside of this portion 19 is an opening 20 into which the packing rings 21 are placed. The outer surface of the inner sleeve 10 engages a ring 22 on the sleeve 9 and the enlarged portion 23 of the sleeve 10 engages the outer surface of the opening 20 so that the packing rings 21 will be squeezed between the two sleeves and any wear that may develop in the rings may be taken up by the adjusting nut 11. The outer end of the sleeve 10 projects out beyond the nut 11 so that an elbow 24 or the end of a hose may be attached to it and this pipe or hose may also be connected to a faucet or water tap so that a supply of water may be connected to the sleeve which may pass through it and into a hose on the reel as hereinbefore described. In the outside of the sleeve 9 is a recess 25 in which it is held in the upper end of the support 3.

The support 3 is constructed of a flat piece of plate which is bent as shown in Figure 2 with a semi-circle bent in its center to conform to the outer surface of the sleeve 2 and to fit into the recess 25. When the sleeve is in place a cap 26 is placed over the upper side of the sleeve and this cap has projections or fingers 27 on it that are bent around and under the support 3 in order to hold the cap in place. These fingers 27 are on each end of the cap and grip the support on each side of the sleeve so that the cap will be held rigidly to the support. The lower ends of the support 3 are bent outward and bolted to the base 4 by the bolts 28, the heads of which are counter-sunk in the holes 29 in the lower side of the base.

The base 4 is constructed with the longitudinal members 30 and the cross members 31 which fit into recesses 32 in the longitudinal members and are held in place by the bolts 28 that hold the support to the base.

The disc 6 which forms the left hand end of the reel has a projection 33 on it which has a recess 34 in it to correspond with the recess 25 in the sleeve 9 and this end of the reel is supported through this recess on one of the supports 3 in a manner similar to that of the opposite end. It is understood that this projection 33 may be of any suitable design and may be attached to the disc 6 in any desired manner.

It is understood that changes may be made in the construction without departing from the spirit of the invention. One of which changes may be in the design of the reel, another may be in the design of the means for supporting it, and still another may be in the means for connecting the inner end of the hose to the water supply.

The construction will be readily understood from the foregoing description. To use the device it may be assembled as shown and the inner end of a hose may be attached to a fitting 17 and the hose rolled on the reel. It will then be seen that the reel may be placed at the water tap and the fitting 24 connected to it. The hose may then be used in the usual manner and if it is only desired to use a short piece of it, this short piece may be pulled from the reel without unwinding the entire hose; then when it is desired to place the hose back on the reel one end of the hose is already attached to the reel and it will be a comparatively simple process to wind the balance of it on the reel; whereas at present it is necessary to unwind and rewind the entire hose. And it will also be seen that water will run through the hub while the reel is turning.

Having thus fully described the invention, what I claim as new and desire to secure by Letters Patent, is:—

1. A hose reel of the class described embodying a reel comprising two wood discs; strips connecting the discs together; guards in the form of large staples projecting outward from the discs; hubs on the discs; suitable frames for supporting the hubs; a base for supporting the frames; one of said hubs being constructed in the form of a sleeve with flanges on it by which it may be bolted to the disc; a pipe attached to the inner end of the sleeve and projecting through the wall of the reel; a fitting on the end of the pipe to which a hose may be connected; an inner sleeve in the outer end of the former sleeve; packing rings between shoulders on the two sleeves; an adjusting nut for holding the sleeves against the packing rings; and a connection on the outer end of the inner sleeve by which it may be connected to a water supply.

2. A hose reel of the type described embodying a reel; hubs on the reel having recesses in them through which a band support may be attached to the hubs on their lower sides; a cap for fitting in the recess on the upper side having fingers on its ends which may be bent around the band forming the support; one of said hubs being in the form of a sleeve having a connection from its inner end to a fitting on the outside of the face of the reel; and having an adjustable connection on its outer end through which it may be connected to a water supply, so that water may run through the hub to the hose on the reel while it is turning.

CHARLES O. PAUL.